United States Patent [19]

Kelly et al.

[11] Patent Number: 4,916,601
[45] Date of Patent: Apr. 10, 1990

[54] MEANS FOR TRANSFERRING FIRMWARE SIGNALS BETWEEN A CONTROL STORE AND A MICROPROCESSOR MEANS THROUGH A REDUCED NUMBER OF CONNECTIONS BY TRANSFER ACCORDING TO FIRMWARE SIGNAL FUNCTION

[75] Inventors: Richard P. Kelly, Nashua, N.H.; Jian-Kuo Shen, Belmont, Mass.; Robert V. Ledoux, Litchfield, N.H.; Chester M. Nibby, Jr., Beverly, Mass.

[73] Assignee: Bull HN Information Systems Inc., Billerica, Mass.

[21] Appl. No.: 286,581

[22] Filed: Dec. 19, 1988

[51] Int. Cl.4 .................................................. G06F 9/22
[52] U.S. Cl. ...................................... 364/200; 364/951; 364/260.2; 364/239.4; 364/244.6
[58] Field of Search ... 364/200 MS File, 900 MS File

[56] References Cited

U.S. PATENT DOCUMENTS

| | | | |
|---|---|---|---|
| 4,181,934 | 1/1980 | Marenin | 364/200 |
| 4,621,341 | 11/1986 | New | 364/900 |
| 4,752,907 | 6/1988 | Si et al. | 364/900 |

Primary Examiner—Gareth D. Shaw
Assistant Examiner—Gopal C. Ray
Attorney, Agent, or Firm—George Grayson; John S. Solakian; Gary D. Clapp

[57] ABSTRACT

A firmware controlled microprocessor plugged into a printed circuit board received firmware signals from a control store mounted on the printed circuit board. The number of pins required for transferring firmware signals is reduced by time sharing pins with firmware signal required for the full cycle of operation and firmware signal required only during the second half of the cycle of operation.

4 Claims, 2 Drawing Sheets

MEANS FOR TRANSFERRING FIRMWARE SIGNALS BETWEEN A CONTROL STORE AND A MICROPROCESSOR MEANS THROUGH A REDUCED NUMBER OF CONNECTIONS BY TRANSFER ACCORDING TO FIRMWARE SIGNAL FUNCTION

RELATED APPLICATIONS

The following United States patent applications are related applications to the instant application and are filed on an even date herewith.

1. The patent application of Richard P. Kelly, Jian-Kou Shen, Robert V. Ledoux and Deborah K. Staplin entitled, "Control Store Addressing from Multiple Sources," filed on Dec. 19, 1988, Ser. No. 286,578, which is assigned to the same assignee as this patent application.
2. The patent application of Ming-Tzer Miu and Thomas F. Joyce entitled, "Production Line Method and Apparatus for High Performance Instruction Execution," filed on Dec. 19, 1988, Ser. No. 286,580, which is assigned to the same assignee as this patent application.
3. The patent application of Richard P. Kelly, and Robert V. Ledoux entitled, "Control Store Address Generator for Developing Unique Instruction Execution Starting Address," filed on Dec. 19, 1988, Ser. No. 286,582, which is assigned to the same assignee as this patent application.
4. The patent application of David E. Cushing, Romeo Kharileh, Jian-Kou Shen and Ming-Tzer Miu entitled, "A Dual Port Read/Write Register File Memory," filed on Dec. 19, 1988, Ser. No. 286,552, which is assigned to the same assignee as this patent application.
5. The patent application of David E. Cushing, Romeo Kharileh, Robert V. Ledoux and Jian-Kou Shen entitled, "A Mechanism for Automatically Updating Multiple Unit Register File Memories," filed on Dec. 19, 1988, Ser. No. 286,551, which is assigned to the same assignee as this patent application.

BACKGROUND OF THE INVENTION

1. Field of Use

This invention is related to data processing systems and more particularly to the mechanical pin arrangement of control store signals.

2. Prior Art

The central processing units of the early system executed their instructions using hard wired logic. However, as the cost of memory elements came down, firmware systems were developed. The firmware bits were stored in locations of a read only memory (ROM) or a random access memory (RAM). Some systems stored some firmware bits in ROM and other firmware bits in RAM to reduce cost.

Present day system include entire central processing units designed into a single semiconductor logic element (chip) which are plugged into a matching connector on a printed circuit board.

The chip designs have very sophisticated logic that must communicate with many subsystems outside the chip. In addition, the logic in the chip is firmware controlled and the control store RAM's or ROM's are plugged into connectors mounted on the printed circuit board. Unfortunately, the logic on the chip requires a large number of firmware bits, typically of the order of 100 bits; each bit being applied to the chip through a single pin connection. Therefore, in the prior art, 100 firmware bits requires 100 pin connections. This limits the number of pins which are available for other functions. In some instances, trade-offs have to be made and system performance suffers.

Another solution is to use an additional semiconductor chip because of the shortage of pins and provide a means for both chips to work in concert with each other. This solution solves the pin problem but also introduces a new set of timing problems associated with communication between the two chips.

Accordingly, it is object of the invention to reduce the number of pins required to transfer signals between a printed circuit board and a semiconductor logic element plugged into the board.

SUMMARY OF THE INVENTION

A semiconductor logic element plugged into a printed circuit board receives firmware signals from a control store mounted on the printed circuit board. These firmware signals control the operation so that functions are executed in a single clock cycle. The number of pins required is reduced by time sharing signal lines between firmware signals required during the entire cycle, and firmware signals required during the second half of the cycle.

DESCRIPTION OF THE PREFERRED EMBODIMENT

Figure 1:
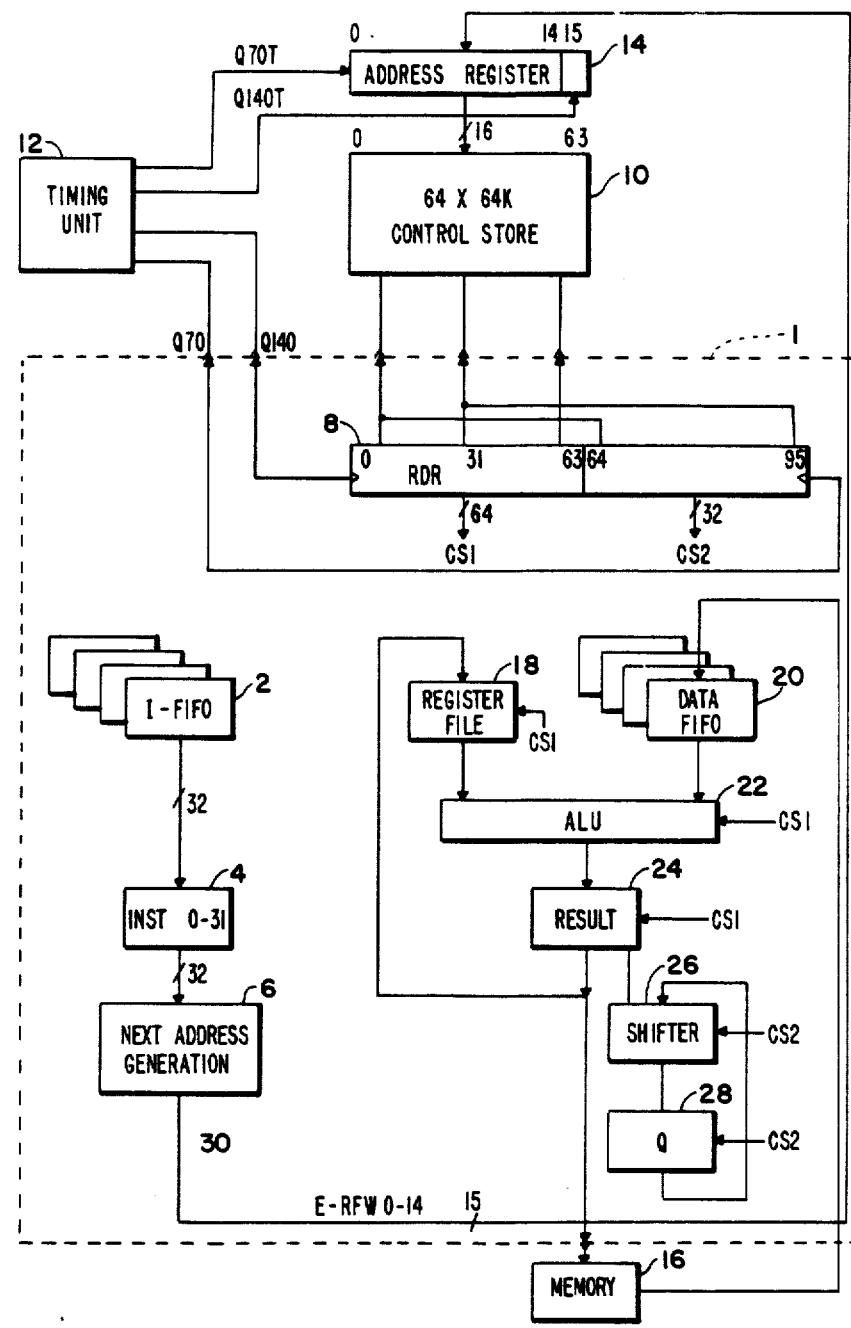
FIG. 1 shows a block diagram of a portion of a typical system which includes apparatus which demonstrates the invention.

FIG. 1 shows a block diagram of the elements of the invention. A firmware controlled execution unit (E) microprocessor chip 1 receives firmware signals from a 64 bit per word by 64 K word control store 10. The output signals from control store 10 are stored in a 96 bit RDR register 8. The RDR register 8 is loaded in two cycles specified by timing signals Q140 and Q70 from timing unit 12. Timing unit 12 is typical of many timing units or clock units used throughout the computer industry.

An address register 14 is loaded at time Q70 with an even address, that is bit 15 is at ZERO. The contents of address register 14 address control store 10. The output of the addressed even location in control store 10 is sent over control store 10 lines 00 through 63 and is stored into bit positions 0-63 of an RDR register 8 at time Q140. The contents of the address register 14 is incremented by timing signal Q140 forcing bit 15 to a ONE. The output of the addressed odd location is sent from control store 10 to RDR 8 over control store 10 lines 0 through 31 and stored in bit positions 64 through 95 at time Q70.

The E unit 1 executes instructions which are stored in an instruction first in first out (FIFO) unit 2. The next instruction to be executed is stored in a 32 bit instruction register INST 4. Output of register 4 is applied to a next address generation (NAG) unit 6 which decodes the operation code and addressing bits incorporated in the instruction and generates its control store address signals E-RFW 0 through 14. Signals E-RFW 0-14 are stored in address register 14 at time Q70.

The firmware bits 0-95 are used to execute the instruction initially stored in register 4 in a single cycle. Operations within the E unit 1 are performed in either a full cycle using bits 0-63 (CS1) of the RDR register 8 or during the second half of the cycle using bits 64-95 (CS2). Most source cycles require the full cycle from times Q140 to Q140. But destination control functions only require a half cycle operation from times Q70 to Q140.

Typical full cycle operations under control signals CS1 are for example operating on information taken from a register file 18 information received from memory 16 and storing the result back in the register file 18 via an arithmetic logic unit (ALU) 22 and a result register 24. Typical half cycle operations under control of signals CS2 such as taking information from a shifter 26 and loading into a Q register 28 requires only the second half of the cycle.

This invention reduces the pin requirement for the control store 10 connection to the E unit 1 by 32 pins; ie, from 96 to 64 pins by timesharing the first 32 pins.

Figure 2:
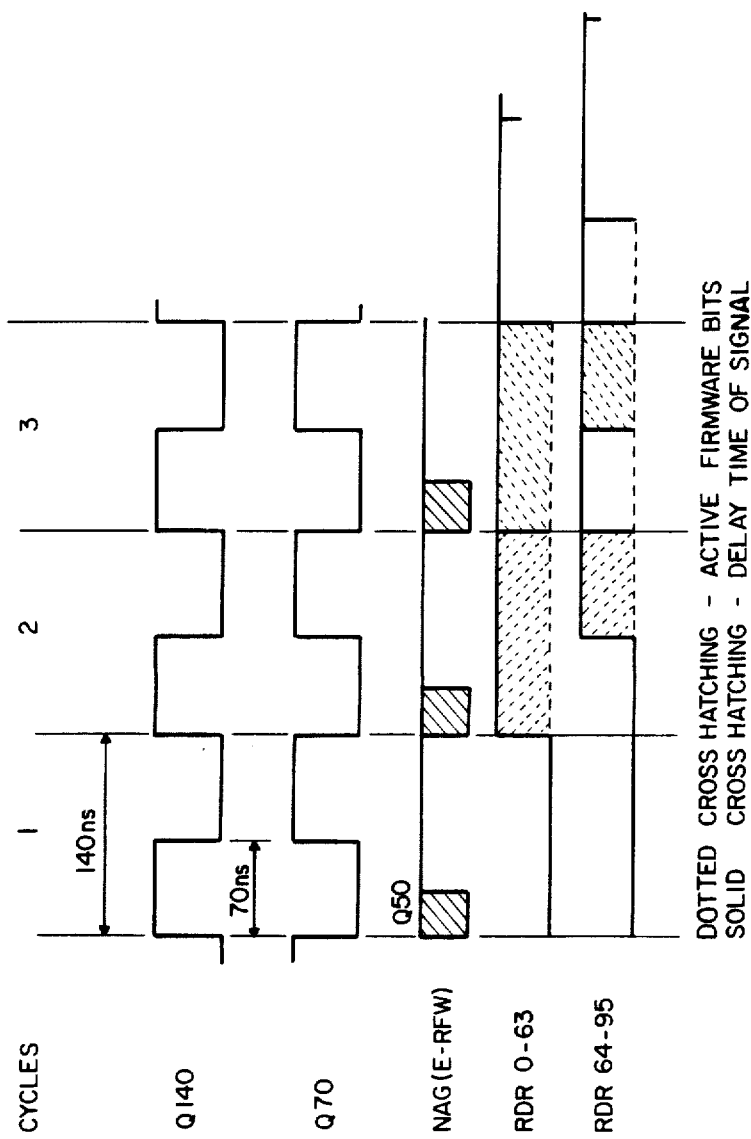
FIG. 2 shows a timing chart of the timing of the timeshared signals.

FIG. 2 shows a timing diagram of the double pump operation of control store 10.

Timing signal Q140 is a cyclic signal, which by its rise, defines the basic 140 nanosecond per cycle timing of the E unit 1. Timing signal Q70 lags signal Q140 by 70 nanoseconds, that is, it rises on the fall of each cycle of the Q140 timing signal.

The output signals from the NAG 6, E-RFW 00-14 appear on a bus 3 during the first half of each cycle and are clocked into the address register 14 by timing signal Q70. The 64 bit location specified by the contents of address register 14 at time Q70 is loaded into RDR 0-63 at time Q140 for cycle 2 and each subsequent cycle. The 32 bit location specified by the contents of address register 14 is loaded into RDR 64-95 at time Q70. Note that the firmware bits RDR 00-63 are active for the complete cycle and the firmware bits RDR 64-95 are active during each second half cycle, that is from time Q70 to time Q140.

While the invention has been shown and described with reference to the preferred embodiment thereof, it will be understood by those skilled in the art that the above and other changes in form and detail may be made therein without departing from the spirit and scope of the invention.

What is claimed is:

1. In a data processing system having a microprocessor means to perform operations in response to instructions and a separate control store means for storing firmware signals for controlling operations of the microprocessor wherein there are firmware signals corresponding to each of the instructions, means for transferring the firmware signals from the control store to the microprocessor means, comprising:

clocking means for generating a first cyclic timing signal defining cycles of operation and a second cyclic timing signal defining a second half cycle in each cycle of operation, address generator means for generating control store address signals wherein each control store address signal corresponds to an instruction and identifies corresponding operations to be performed by the microprocessor means during each of the cycles of operation, control store means for storing the firmware signals wherein the firmware signals corresponding to each of the instructions are comprised of a first plurality of firmware signals representing full cycle operations to be performed during each of the cycles of operation, and a second plurality of firmware signals representing half cycle operations to be performed during the second half cycles of the cycles of operations, wherein during each cycle of operation the control store means in responsive to the address signal corresponding to the present instruction and, and to the second timing signal for reading out the corresponding first plurality of firmware signals, and to the next first timing signal for reading out the second plurality of firmware signals, and in the microprocessor means, pin connector means connected from the control store means for receiving the first and second pluralities of firmware signals, wherein the number of individual pin connectors is equal to the larger of the first and second plurality of firmware signals, and less than the number of firmware signals corresponding to an instruction, first register means connected from the pin connector means and responsive to the second timing signal during each previous cycle of operation for receiving the first plurality of firmware signals corresponding to the present instruction and providing the first plurality of firmware signals to the microprocessor means during the entire cycle of operation, and second register means connected from the pin connector means and responsive to the first timing signal during each cycle of operation for receiving the second plurality of firmware signals corresponding to the present instruction and providing the second plurality of firmware signals to the microprocessor means during the second half cycle of the cycle of operation, the microprocessor means being responsive to the first and second plurality of firmware signals to perform the full and half cycle operations corresponding to the present instruction.

2. The firmware signal transfer means of claim 1, wherein:

the first and second pluralities of firmware signals corresponding to an instruction are stored respectively in corresponding consecutive first and second address locations in the control store means, the address signal corresponding to an instruction is the corresponding address in the control store means of the first plurality of firmware signals corresponding to the instruction, and during a cycle of operation, the control store means is responsive to the second timing signal and the address signal to select the corresponding first address location in the control store means, and to the first timing signal to select the corresponding next consecutive address location in the control store means.

3. The firmware signal transfer means of claim 1, wherein the microprocessor means comprises:

means responsive to the first pluralities of firmware signals for performing the corresponding full cycle operations, and means responsive to the second pluralities of firmware signals for performing the corresponding half cycle operations.

4. The firmware signal transfer means of claim 1, wherein the first timing signal leads the second timing signal by one half of a cycle of operation during each cycle of operation.

* * * * *